T. ROLAND.
INCLINOMETER AND COMPASS COMBINED.
APPLICATION FILED MAR. 14, 1918.
1,294,710.
Patented Feb. 18, 1919.
2 SHEETS—SHEET 2.
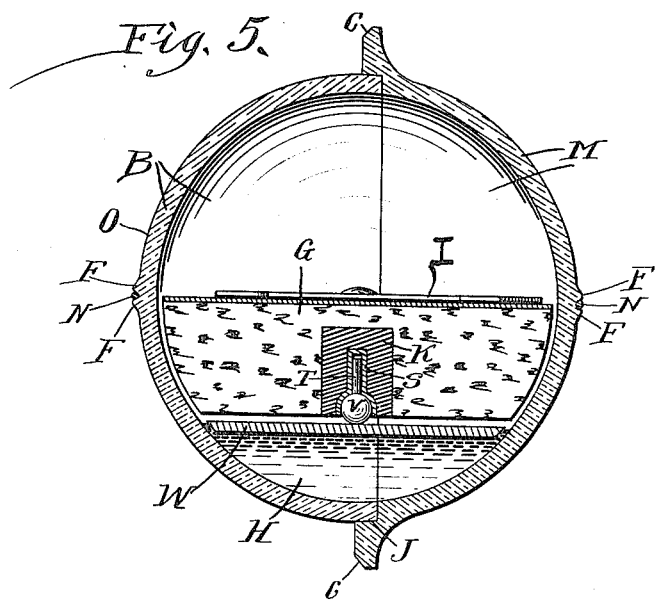
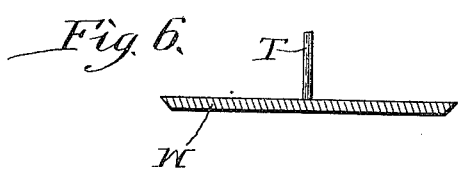
Inventor
Theodore Roland

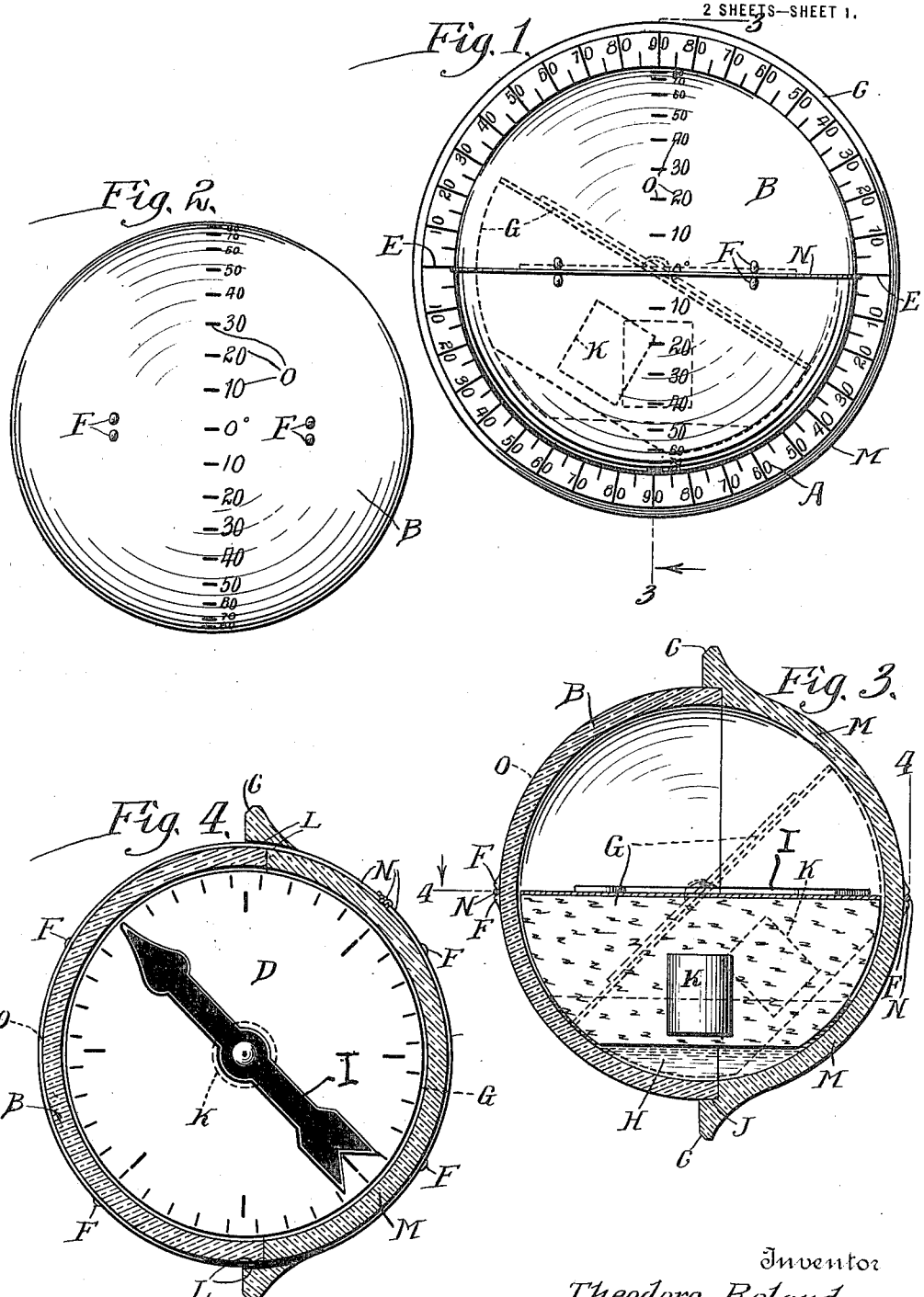

UNITED STATES PATENT OFFICE.

THEODORE ROLAND, OF MENOMONIE, WISCONSIN.

INCLINOMETER AND COMPASS COMBINED.

1,294,710.    Specification of Letters Patent.    Patented Feb. 18, 1919.

Application filed March 14, 1918. Serial No. 222,387.

*To all whom it may concern:*

Be it known that I, THEODORE ROLAND, a citizen of the United States, residing at Menomonie, in the county of Dunn and State of Wisconsin, have invented a new and useful Inclinometer and Compass Combined, of which the following is a specification.

My invention is a device for indicating the direction horizontally as well as the degree of inclination from the horizontal of an aerial machine, and it is my object to provide means for keeping the compass horizontal regardless of what angle the machine may take from the horizontal.

It is my object to provide an instrument that will be especially useful in foggy and cloudy weather when the ground below cannot be seen and which will make possible the manipulation of the control apparatus independent of outside observation, except when landing.

In the accompanying drawings, illustrating my invention:

Figure 1 is a side elevation of the instrument;

Fig. 2 is a detail of one section of the glass globe;

Fig. 3 is a section on line 3—3 of Fig. 1;

Fig. 4 is a section on line 4—4 of Fig. 3;

Fig. 5 is a section similar to Fig. 3 of a modified form of the invention; and

Fig. 6 is a detail of member W.

Like letters designate like parts throughout the views.

Referring to the accompanying drawings I provide a glass globe made in two sections, B and M which engage at joint J. Member M is provided with an annular collar A on which is marked a suitable scale, on which E designates the center line at zero. I prefer to provide collar A with a beveled portion C. The two sections of the glass globe are held together in a suitable manner as by a binding cord N, which is kept in place by the small projections F.

The glass globe described contains a float G of cork or other light material. The float has a compass face D on which needle I is pivotally mounted. The cork float G is provided at its central bottom portion with a lead weight K. Float G rests on a quantity of mercury as shown in Fig. 3.

I provide graduated markings 0 on the glass globe as shown in Fig. 1.

In the modified form of my invention shown in Fig. 5, I provide a plate W resting on the mercury and having a pin T projecting upward into a tube S inserted into the weight K. I prefer to provide also a small ball bearing V, which is slipped over the pin T and fixed solidly to plate W. The float G is supported on the pin and ball bearing and does not touch the plate or disk W. The purpose of this construction is to prevent circular movement of float G being conveyed from mercury H when sudden changes of inclination of the aircraft occur.

In use the instrument is mounted on the aircraft and must tilt to the same degree as the aircraft. The compass will remain horizontal by reason of the force of gravity on the mercury and the float resting on the mercury. When the aircraft is resting or traveling in a horizontal position the top line of the floating compass will indicate zero on all graduated lines of the globe. When the aircraft is tilted the float will move up or down along the graduated scale indicating the exact degree of inclination, while at the same time the magnetic needle of the compass performs its usual function of pointing to the north. By combining the compass and inclinometer not only is the cost of an additional instrument obviated, but the aviator is saved the confusion of watching two instruments instead of one.

It is understood that a suitable housing or casing for the instrument may be provided, or that the instrument may be installed in the aircraft with or without casing.

It will be obvious to those skilled in the art that variations and modifications may be made in the apparatus without departing from the principle of my invention.

As shown in Fig. 3, the float is weighted, which makes it rest very firmly on the mercury, and the resistance offered by this liquid damps any movement of the float.

In the modified form of the invention shown in Fig. 5 the float rests on the pin and bearing, does not come in contact with plate W, and any slight rotating movement that may be communicated to that plate by the mercury does not affect the float which carries the compass.

What I claim is:

1. An inclinometer and compass combined consisting of a transparent globe, the globe being made in two sections and having a graduated collar on one of the sections, and having scale markings disposed on a plane intersecting that of the graduated collar, a heavy liquid contained within the globe to indicate changes in position of the instrument from the horizontal, a weighted compass float supported by the heavy liquid, and a magnetic needle mounted on the float.

2. An inclinometer and compass combined consisting of a transparent globe, the globe being made in two sections and having a graduated collar on one of the sections, and having scale markings disposed on a plane intersecting that of the graduated collar, means securing the globe sections together on a median normal horizontal line, a heavy liquid in the globe, a float-supported compass, a floating plate resting directly on the heavy liquid, and means pivotally supporting the float-supported compass in spaced relation to the floating plate, whereby any rotational movement of the mercury is prevented from being transmitted to the compass.

THEODORE ROLAND.